(12) United States Patent
Yang et al.

(10) Patent No.: US 12,118,162 B1
(45) Date of Patent: Oct. 15, 2024

(54) TOUCH DISPLAY DRIVE CIRCUIT, DRIVE METHOD AND TOUCH DISPLAY PANEL

(71) Applicant: HKC CORPORATION LIMITED, Shenzhen (CN)

(72) Inventors: Yuanjie Yang, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/348,619

(22) Filed: Jul. 7, 2023

(30) Foreign Application Priority Data

Mar. 28, 2023 (CN) .......................... 202310310645.4

(51) Int. Cl.
*G06F 3/041* (2006.01)

(52) U.S. Cl.
CPC ........ *G06F 3/04166* (2019.05); *G06F 3/0412* (2013.01)

(58) Field of Classification Search
CPC ........................... G06F 3/04166; G06F 3/0412
See application file for complete search history.

(56) References Cited

U.S. PATENT DOCUMENTS

| | | | |
|---|---|---|---|
| 2010/0201653 A1 | 8/2010 | Saitoh et al. | |
| 2018/0143712 A1* | 5/2018 | Lee ...................... | G06F 3/044 |
| 2020/0210011 A1* | 7/2020 | Kim ...................... | G06F 3/0412 |
| 2021/0064214 A1 | 3/2021 | Hsu et al. | |
| 2021/0382599 A1 | 12/2021 | Gong et al. | |
| 2022/0253192 A1 | 8/2022 | Forman | |

FOREIGN PATENT DOCUMENTS

| | | |
|---|---|---|
| CN | 105023544 A | 11/2015 |
| CN | 105843442 A | 8/2016 |
| CN | 106020561 A | 10/2016 |
| CN | 107437404 A | 12/2017 |
| CN | 109407874 A | 3/2019 |
| CN | 112259051 A | 1/2021 |
| CN | 112735335 A | 4/2021 |
| CN | 112835475 A | 5/2021 |
| CN | 112925448 A | 6/2021 |
| CN | 113377273 A | 9/2021 |
| CN | 114089867 A | 2/2022 |
| CN | 114299845 A | 4/2022 |
| CN | 116027931 A | 4/2023 |
| WO | 2022134207 A1 | 6/2022 |

OTHER PUBLICATIONS

Search Report issued on Dec. 11, 2023, in corresponding International Application No. PCT/CN2023/105116, 6 pages.

* cited by examiner

*Primary Examiner* — Matthew A Eason
*Assistant Examiner* — Chayce R Bibbee
(74) *Attorney, Agent, or Firm* — Maier & Maier, PLLC

(57) ABSTRACT

A touch display drive circuit, a drive method and a touch display panel. The display panel includes: M rows and N columns of touch display units; the M rows and N columns of touch display units form K partitions along a column direction, and each partition includes m rows and N columns of touch display units; the touch display drive circuit includes a control module and M×N multiplex selection modules. By dividing the display panel into a plurality of partitions and providing a multiplex selection module for each touch display unit, the touch signal can be written into other partitions while controlling the display be written into one partition.

14 Claims, 5 Drawing Sheets

TOUCH DISPLAY DRIVE CIRCUIT, DRIVE METHOD AND TOUCH DISPLAY PANEL

CROSS-REFERENCE TO RELATED APPLICATION

This application claims priority to Chinese Patent Application No. 202310310645.4, filed on Mar. 28, 2023, the content of which is incorporated herein by reference as if fully set forth herein.

TECHNICAL FIELD

The present application relates to display technical field, and more particularly to a touch display drive circuit, a drive method and a touch display panel.

BACKGROUND

With the development of display technology, the display and touch requirements of display devices are increasingly high. The common electrode of the embedded self-capacitated display touch screen is divided as a touch screen sensor. After the common electrode is divided, each common electrode driver serving as a touch screen sensor needs to be driven independently by the control circuit. For the touch screen sensor, the touch signal and display drive signal are input alternately at a time, which greatly increases the single refresh duration of the touch screen, which is not conducive to the realization of the high refresh touch screen, thus, shortcomings still exist.

SUMMARY

The present application provides a touch display drive circuit, a drive method, and a touch display panel, in order to solve the problem that the touch signal and display drive signal are input alternately at a time, the single refresh duration of the touch screen is greatly increased resulting in inability to adapt to higher requirements and high refresh.

An embodiment of a first aspect of the present application provides a touch display drive circuit applied to a display panel, the display panel includes M rows and N columns of touch display units; the M rows and N columns of touch display units form K partitions along a column direction, and each partition includes m rows and N columns of touch display units; the touch display drive circuit includes a control module and M×N multiplex selection modules, the control module is respectively connected to each of the multiplex selection modules, and the M×N multiplex selection modules are correspondingly connected to the M rows and N columns of touch display units in an one-to-one manner, respectively;

the control module controls a multiplex selection module connected with a first touch display unit to write a display signal to the first touch display unit, and simultaneously controls a multiplex selection module connected with a second touch display unit to write a touch signal to the second touch display unit, the first touch display unit and the second touch display unit are respectively located in a same row and a same column in any two different partitions; and m, M, N, and K are integers greater than 1.

In an embodiment, each multiplex selection module includes one input terminal and two output terminals, one of the two output terminals of the multiplex selection module is coupled with a display electrode of the touch display unit of a corresponding partition, and the other one of the two output terminals is coupled with a touch electrode of the touch display unit of the corresponding partition; and the input terminal is coupled with the control module.

In an embodiment, the multiplex selection module is a multiplexer or a multiplex selection circuit.

In an embodiment, the multiplex selection module includes two transistors, and each of the two
  transistors includes a control terminal, a first terminal, and a second terminal; and
  the control terminal of each of the two transistors is coupled with one of a display scan line and a touch scan line of the corresponding partition, the first terminal of one of the two transistors is coupled with a display signal line, and the second terminal is coupled with the first terminal of the other one of the two transistors, and the second terminal of the other one of the two transistors is coupled with a touch signal line.

In an embodiment, the multiplex selection module includes two transistors, and each of the two transistors includes a control terminal, a first terminal, and a second terminal; and
  the control terminal of each of the two transistors is respectively coupled with a scan line, the first terminal of one of the two transistors is coupled with a display signal output terminal of a drive integrated chip, and the second terminal is coupled with a display electrode of the corresponding partition, the first terminal of the other one of the two transistors is coupled with a touch signal output terminal of the drive integrated chip, and the second terminal is coupled with a touch electrode of the corresponding partition, a high level is written to two scan lines in an one-to-one manner.

In an embodiment, the K is one selected from a group consisting of 2, 3, 4, and 5.

An embodiment of a second aspect of the present application provides a drive method of a touch display drive circuit, including:
  in each sub-frame within a single refresh duration of a display panel, writing, a display signal to a corresponding partition through an i-th multiplex selection module group and a touch signal to the corresponding partition through the j-th multiplex selection module group; and
  the i-th multiplex selection module group corresponding to each sub-frame is different, and the j-th multiplex selection module group corresponding to each sub-frame is different, and the i and j are integers less than k and greater than 1.

In an embodiment, the step of writing, in each sub-frame within the single refresh duration of the display panel, the display signal to the corresponding partition through the i-th multiplex selection module group and the touch signal to the corresponding partition through the j-th multiplex selection module group includes:
  for a g-th sub-frame, writing, the display signal to a g-th corresponding partition through a g-th multiplex selection module group and the touch signal to a g+1-th corresponding partition through a g+1-th multiplex selection module group; wherein the g is an integer less than or equal to K−1 and greater than or equal to 1; and
  for a k-th sub-frame, writing, the display signal to a k-th corresponding partition through a k-th multiplex selection module group and the touch signal to a first corresponding partition through a first multiplex selection module group.

In an embodiment, the step of writing, in each sub-frame within the single refresh duration of the display panel, the display signal to the corresponding partition through the i-th multiplex selection module group and the touch signal to the corresponding partition through the j-th multiplex selection module group includes:

for a g-th sub-frame, writing, the display signal to a g-th corresponding partition through a g-th multiplex selection module group and the touch signal to a q-th corresponding partition through a q-th multiplex selection module group; and a sum of g and q is equal to that of K+1.

An embodiment of a third aspect of the present application provides a touch display panel, which includes m rows and N columns of touch display units and the touch display drive circuit above mentioned; the M rows and N columns of touch display units form K partitions along a column direction, and each partition comprises m rows and N columns of touch display units.

It can be known from the above technical solution that the present application provides a touch display drive circuit, a drive method and a touch display panel. By dividing the display panel into a plurality of partitions and providing a multiplex selection module for each touch display unit, the touch signal can be written into other partitions while controlling the display be written into one partition. After the writing of the display signal in the same partition is completed, when the display signal is being written to the other partitions, the touch signal is written in this partition, so that when all the display signals are written, the touch signal is almost written. Therefore, the writing duration of the touch signal does not need to occupy the writing duration of the display signal. During a single refresh, the duration is only the writing duration of the current display signal. The refresh duration is shorter when comparing to the existing technology that the writing duration of the touch signal needs to be increased, the display duration of the panel is increased, and the high frequency refresh and display are realized.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

DETAILED DESCRIPTION

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

In addition, terms "the first" and "the second" are only used in describe purposes, and should not be considered as indicating or implying any relative importance, or impliedly indicating the number of indicated technical features. As such, technical feature(s) restricted by "the first" or "the second" can explicitly or impliedly comprise one or more such technical feature(s). In the description of the present application, "a plurality of" means two or more, unless there is additional explicit and specific limitation. It should be noted that the touch display drive circuit, a drive method and a touch display panel disclosed in the present application can be used in the field of display technology, and can also be used in any field except the field of display technology. The application field of the touch display drive circuit, the drive method and the touch display panel disclosed in the present application is not limited herein.

Figure 1:
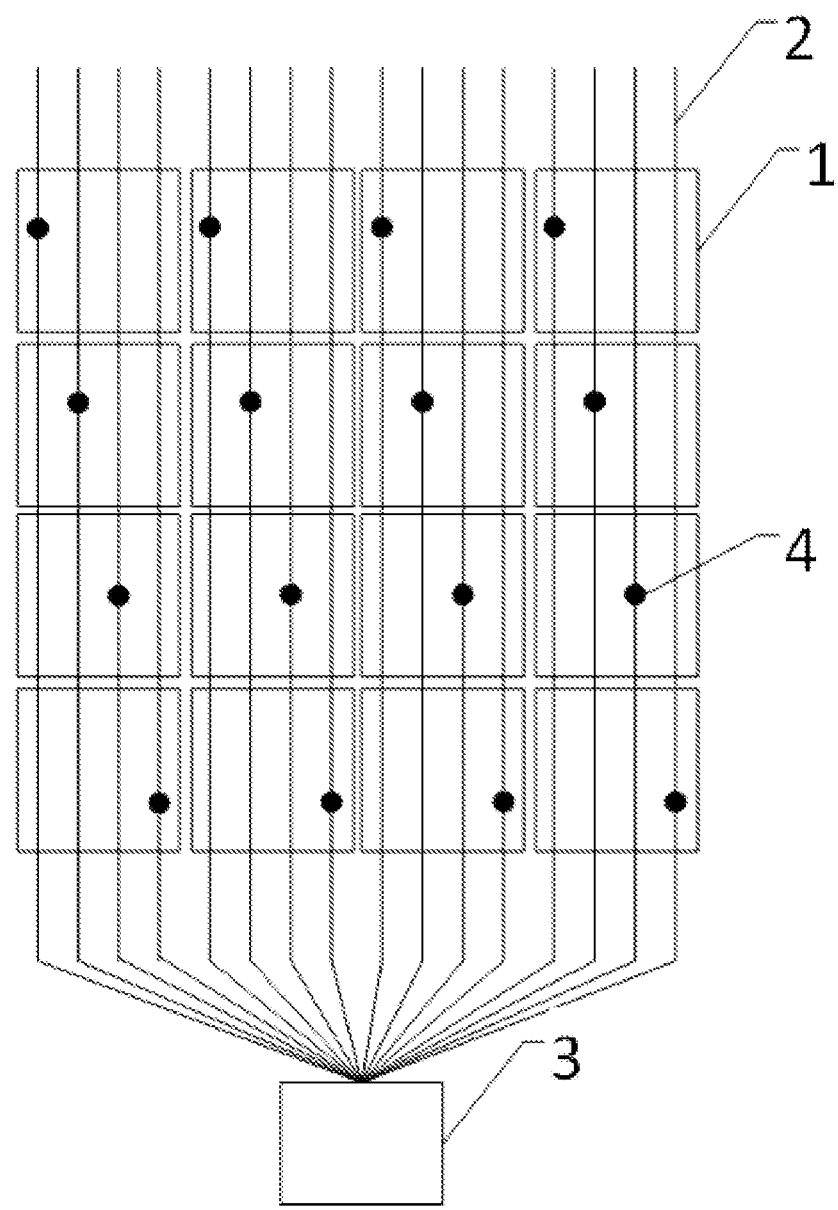
FIG. 1 is a schematic view of a structure principle of a touch display panel in an example technology.

FIG. 1 is a schematic view of a structure principle of a touch display panel in an example technology, as shown in FIG. 1, the common electrode of the embedded self-capacitated display touch screen is divided as a touch screen sensor 1 (including the touch electrode 4). After the common electrode is divided, each common electrode driver as a touch screen sensor needs to be driven independently by the control circuit 3 through a touch signal line 2. For the touch screen sensor, the touch signal and display drive signal are input alternately at a time, which greatly increases the single refresh duration of the touch screen, which is not conducive to the realization of the high refresh touch screen.

Figure 2:
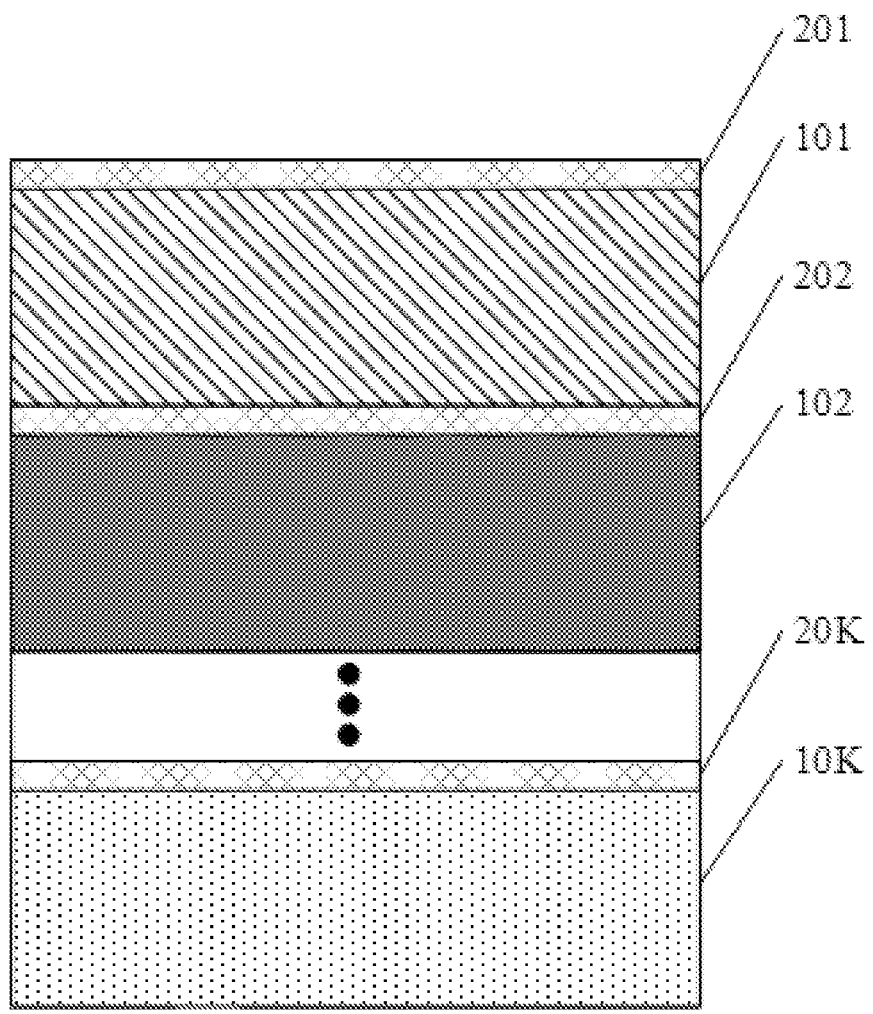
FIG. 2 is a schematic view of a structure principle of a touch display panel of the application embodiment.
Figure 3:
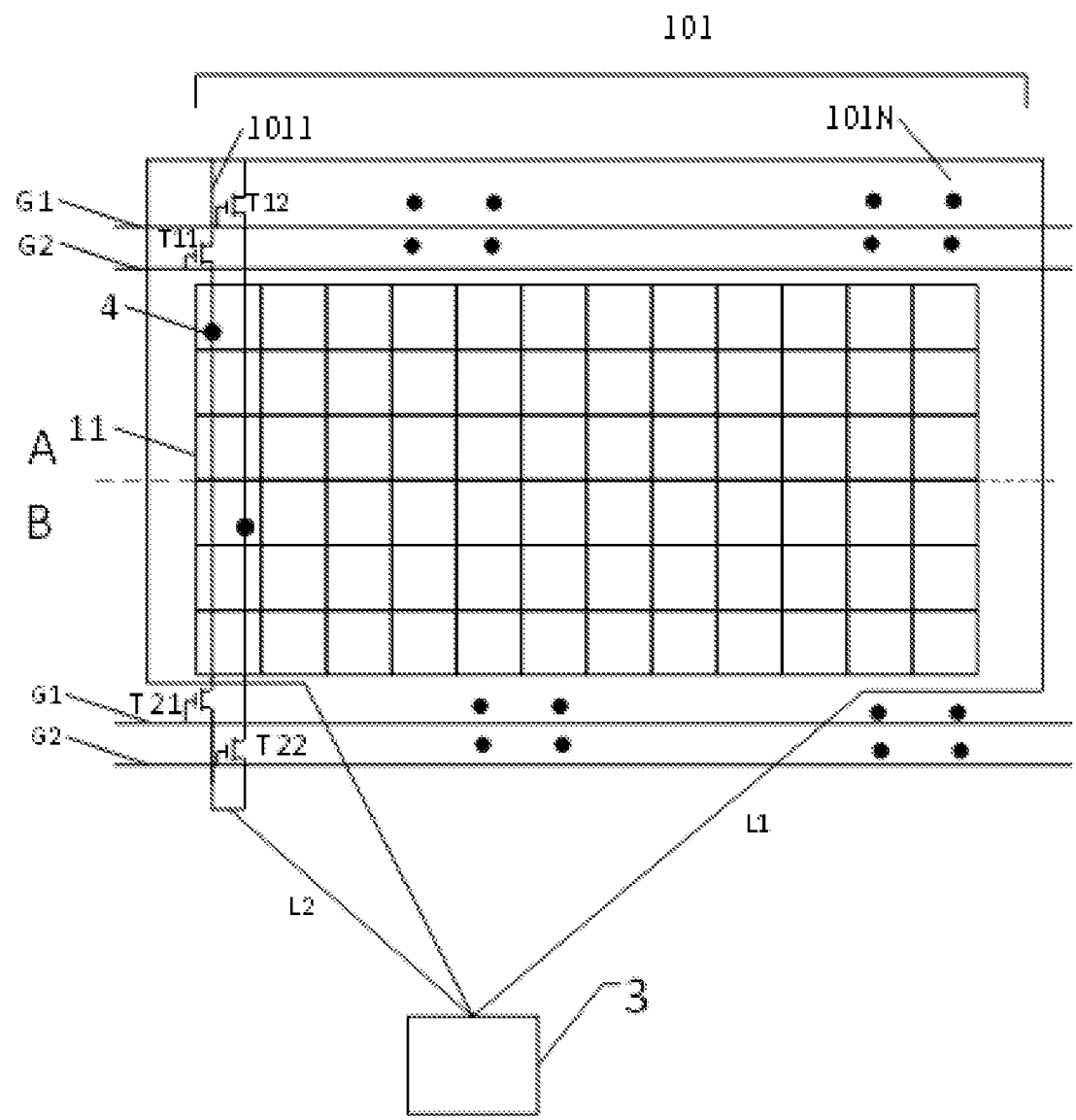
FIG. 3 is a schematic view of a detailed principle of a touch display panel in an embodiment of the present application.

FIG. 2 shows a schematic view of a structure principle of a touch display panel of the application embodiment; and FIG. 3 shows one of the specific structural schematic views of a multiplex selection module in an embodiment of the present application; as shown in FIG. 2, the present application provides a touch display drive circuit applied to a display panel, the display panel forms K partitions (partition 201, partition 202 . . . partition 20K) along a column direction, the touch display drive circuit includes K multiplex selection module groups (multiplex selection module group 101, multiplex selection module group 102, . . . , multiplex selection module group 10K) corresponding to K partitions in an one-to-one manner; as shown in FIG. 3, each multiplex selection module group includes N multiplex selection modules 1011-101N, and each multiplex selection module corresponds to touch display unit 11 in an one-to-one manner. That is, each row and each column correspond to one multiplex selection module.

It should be noted that only one group of multiplex selection modules is shown for each partition in FIG. 2, it can be understood that, according to the above discussion of multiplex selection modules, M×N multiplex selection modules and M×N touch display units are provided in the embodiment of the present application. Meanwhile, among the K partitions, each partition includes m rows and N columns of touch display units, and the touch display drive circuit includes a control module and M×N multiplex selection modules, the control module is respectively connected with each of the multiplex selection modules, and the M×N multiplex selection modules are respectively connected to the m rows and N columns of the touch display units in an one-to-one manner.

As shown in FIG. 3, the control circuit 3 can output a display signal and a touch signal. It should be further understood that in the embodiment of the present application, when the control circuit 3 displays a frame image on the display panel, which needs to output the display signal and the touch signal to each row of touch display unit row by row. Generally, the writing of the display signal in each partition starts from the first row of the partition. Similarly, the touch signal is written from the first row of the partition.

It can be understood that the present application can be written in a non-sequential row-by-row manner based on the requirements of the actual process, such as cross-row writing or out-of-order writing. However, it should be noted that such a configuration requires additional strict control over the timing of each scan signal. Therefore, in general, the current drive methods are mostly driven in a sequential row-by-row manner. Obviously, the present application does not limit the specific drive method of each partition, that is, even if the partition is driven in other feasible ways, it should be within the scope of protection of the present application.

It can be understood that the touch and display at a time of the whole panel mentioned above is a single refresh duration, that is, within "one frame" or "one display frame", that is, in the embodiment of the present application, in one of the sub-frames within a single refresh duration of the display panel, only one multiplex selection module group (that is, m×N multiplex selection modules) writes a display signal to one of the corresponding partitions; and only another multiplex selection module group (that is, m×N multiplex selection modules) writes a touch signal to another corresponding partition.

The present application provides a touch display drive circuit. By dividing the display panel into a plurality of partitions and providing a multiplex selection module for each touch display unit, the touch signal can be written into other partitions while controlling the display in one partition. After the writing of the display signal in the same partition is completed, when the display signal is being written to the other partitions, the touch signal is written in this partition, so that when all the display signals are written, the touch signal is almost written. Therefore, the writing duration of the touch signal does not need to occupy the writing duration of the display signal. During a single refresh, the duration is only the writing duration of the current display signal. The refresh duration is shorter when comparing to the existing technology that the writing duration of the touch signal needs to be increased, the display duration of the panel is increased, and the high frequency refresh and display are realized.

Specifically, as shown in FIG. 2, K multiplex selection module groups correspond to K partitions in an one-to-one manner in specific use. It should be understood that the positions of K multiplex selection module groups in the embodiment of the present application can be arbitrarily arranged as required, as long as the K multiplex selection module groups can form an electrical connection with corresponding partitions, and then signals can be further selectively written.

For example, K is an integer selected from 2 to 4, such as K=2, or K=3, it can be understood that the present application does not limit the specific number of K, as long as it can be prepared by process, K can be determined according to the size of the display screen, for example, the K can be set to be 8 for a 85-inch display screen, and the K can be set to be 4 for a 65-inch display screen, which is not repeated in the present application.

Taking K=3 as an example, 3 multiplex selection module groups are each responsible for the display and touch of one partition. The present application does not limit the partitions that each multiplex selection module group is responsible for. For example, the first multiplex selection module group can be responsible for the first partition, that is, the corresponding relationship is formed according to the location, or the first multiplex selection module group can be responsible for the third or second partition. That is, the corresponding relationship is not formed according to the location, which is not limited herein, as long as it can meet the requirements of panel space.

In addition, for a single multiplex selection module group, one of the display signal and touch signal is selected to be written to the corresponding partition, that is, one of the display signal and touch signal is selected to be written to each partition at the same time.

In an embodiment of the present application, a duration of writing the display signal in one partition is defined as a sub-frame, that is, there are a total of K sub-frames within a single refresh duration of the display panel. The partitions are formed along the column setting direction, since the display scanning mode of the panel is row scanning, that is, when one row scanning is completed and the next row is displayed, at this time, the partitions are in the order of row scanning, so that only one partition in a sub-frame is writing display signals.

For example, when scanning from top to bottom, partitions above the partition have completed the writing of display signal in the first few sub-frames, while partitions below the partition have not been written of display signal. Meanwhile, the writing of touch signal can also be written in the way of row scanning or in other out-of-order manners, which is not limited in the present application.

It should be noted that, generally, the single refresh duration of the display panel is 1/60 second, that is, the corresponding display frequency is 60 Hz, or frequency of 120 Hz or 144 Hz can be achieved currently. In the present application, the writing duration of the touch signal does not need to occupy the writing duration of the display signal. In the case of single refresh, the single refresh duration is only the writing duration of the current display signal. Therefore, the display frequency can be further increased to 188 Hz.

In addition, it should be further explained that the multiplex selection module group in the present application includes multiplex selection modules corresponding to the number of columns, that is, each multiplex selection module is used to control the display signal and touch signal writing of a touch display unit corresponding to the corresponding partition. In the embodiment, each multiplex selection module comprises one input terminal and two output terminals, one of the two output terminals of the multiplex selection module is coupled with a display electrode of the touch display unit of a corresponding partition, and the other one of the two output terminals is coupled with a touch electrode of the touch display unit of the corresponding partition; and the input terminal is coupled with the control module. At this time, the input terminal inputs one of the display signal and the touch signal output by the control module, and the output terminal is controlled by the control module to output. For example, when the output terminal outputs the display signal, the input is a display signal, the display signal is output to the display electrode of the touch display unit through one of the output terminals; when the output terminal outputs the touch signal, the touch signal is output to the touch electrode of the touch display unit through the other output terminal. In the embodiment, the touch electrode of the touch display unit is generally a touch electrode.

It is understood that the scan lines in the embodiment of this application include the display scan lines for controlling the writing of the display signal and the touch scan lines for controlling the writing of the touch signal, and which is not limited in the present application.

In one of the embodiments of the present application, the multiplex selection module is a multiplexer or a multiplex selection circuit. In the embodiment, the scan line is used as the output terminal, the multiplexer or the multiplex selection circuit can be pre-configured to use one of the plurality of output terminals as the output terminal of the multiplex selection module, so that even the input display signals or touch signals cannot be written to other partitions because the other output internals do not output signals. Thus, only one multiplex selection module group writes display signals to the corresponding one of the partitions, and only one other multiplex selection module group writes touch signals to the corresponding other partition. Further, in an embodiment of the present application, the function of the multiplex selection modules can be achieved by a plurality of transistors, in the embodiment, the multiplex selection module includes two transistors, and each of the two transistors comprises a control terminal, a first terminal, and a second terminal; and the control terminal of each of the two transistors is coupled with one of a display scan line and a touch scan line of the corresponding partition, the first terminal of one of the two transistors is coupled with a display signal line, and the second terminal is coupled with the first terminal of the other one of the two transistors, and the second terminal of the other one of the two transistors is coupled with a touch signal line.

Figure 4:
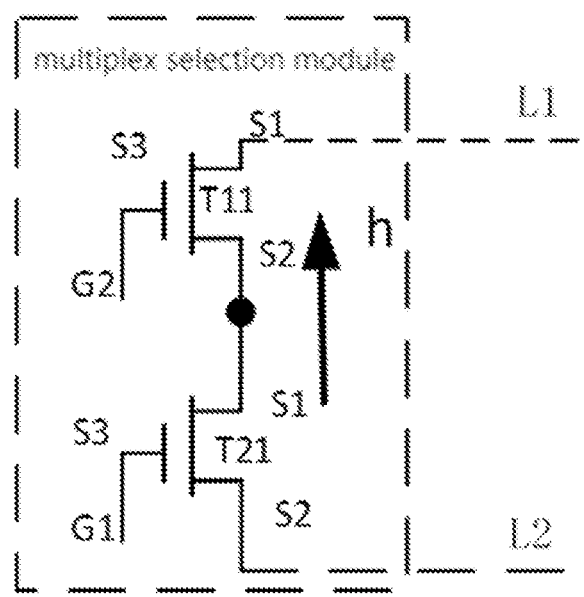
FIG. 4 is a three terminals configuration view of a transistor.

In the embodiment, as shown in FIG. 3, when the number of partitions is equal to 2, one multiplex selection module (1011 to 101N and 1021 to 202N shown in FIG. 3 are all multiplex selection modules) includes two transistors, as shown in FIG. 4, for example, the multiplex selection module 1011 includes: a transistor T11 and a transistor T21, at this time, the input terminal of the multiplex selection module is a display signal line L1 and a touch signal line L2 (the display signal line L1 is input through the first terminal of the transistor T11, that is, the terminal S1 shown in FIG. 4, the touch signal line L2 is input through the second terminal of transistor T21, that is, the terminal S2 shown in FIG. 4), and the control terminal is a scan line G1 and a scan line G2. The output terminals are the second terminal of the transistor T11 and the second terminal of the transistor T21. In the embodiment of the present application, as shown in FIG. 4, the direction above the display panel in the present application is defined as a h direction, then for each transistor, S3 is the control terminal, S1 is the first terminal, S2 is the second terminal, that is, the terminal located "above" in FIG. 3 is the first terminal. The terminals located "below" in FIG. 3 are all the second terminals. As can be seen from FIG. 4, for "a column" of touch display units, the transistors are connected in series up and down to form a multiplex selection module, and the transistors T11 of each row of the touch display unit are connected to the display signal line in parallel; the transistors T21 of each row of the touch display unit are connected to the touch signal line in parallel. In the present application, for two partitions, which will not increase the number of transistors (since one transistor is responsible for touch, another transistor is responsible for display) and can share the line, the number of lines and the length of the line are reduced, which is conducive to line configuration.

The following is a detailed explanation of the embodiment with the number of partitions K=2 in FIG. 3, FIG. 3 includes two partitions A and B, where the partition A is an upper half partition and the partition B is a lower half partition. As can be seen from FIG. 3, the first transistor T11 corresponding to the upper half partition is connected in series with the first transistor T12 corresponding to the lower half partition according to the sequence of columns, and the control terminals of the two transistors are respectively coupled with a scan line. The first terminal of the transistor T11 is coupled to the display signal line L1, and the second terminal of the transistor T12 is coupled to the touch signal line L2, and the display signal line L1 and the touch signal line L2 are issued through the control circuit 3.

It can be understood that the first and second terminals of all transistors in FIG. 3 are shown as S1 and S2 in FIG. 4, which is not repeated herein.

At the same time, the second transistor T21 corresponding to the upper half partition is connected in series with the second transistor T22 corresponding to the lower half partition, and the control terminals of the two transistors are respectively coupled with a scan line. The first terminal of the transistor T21 is coupled to the display signal line L1, and the second terminal of the transistor T22 is coupled to the touch signal line L2, and so on.

In specific use, since the number of partitions in FIG. 3 is set to be K=2, a single refresh duration is divided into two sub-frames. When the first sub-frame is used, the transistor T11 is first turned on or off under the action of display scan line, when the second scan line G2 is in a high level and the first scan line G1 is in a low level, the transistor T11 is turned on, the display signal is written to the display electrodes of a first column in the upper half partition through the display signal line L1 coupled to the first terminal of the transistor T11, similarly, the transistors corresponding to all columns of the upper half partition are turned on, the upper half partition is displayed; at the same time transistor T21 is turned off under the action of the first scan line G1, and the display signal is not written in the lower half partition to realize single partition display signal writing.

At the same time, since the second scan line G2 is in a high level, and the first scan line G1 is in a low level, the corresponding transistor T12 is turned off, since the transistor T12 is responsible for the display writing of the upper half partition, the second terminal of the transistor T12 is only electrically connected with the display electrode of the upper half partition. Therefore, since the first scan line G1 is in a low level, at this time, the touch signal cannot write to the display electrode of the upper half partition. Further, the transistor T22 is responsible for the lower half partition of the touch writing, and the second terminal of the transistor T22 is only electrically connected with the display electrode of the lower half partition. Therefore, since the second scan line G2 is in a high level, at this time, the touch electrode of the lower half partition receives the touch signal, so as to achieve the lower half partition of the touch signal writing.

When the second sub-frame is used, the transistor T11 is first turned on or off under the action of display scan line, at this time, the second scan line G2 is in a low level and the first scan line G1 is in a high level, the transistor T12 is turned on, the display signal is written to the display electrodes of a first column in the lower half partition through the display signal line L1 coupled to the first terminal of the transistor T12, similarly, the transistors corresponding to all columns of the lower half partition are turned on, the lower half partition is displayed; at the same time, the transistor T11 is turned off under the action of the first scan line G1, and the display signal is not written in the upper half partition to realize single partition display signal writing.

At the same time, since the second scan line G2 is in a low level, and the first scan line G1 is in a high level, the corresponding transistor T22 is turned off, since the transistor T22 is responsible for the display writing of the lower half partition, the second terminal of the transistor T22 is only electrically connected with the display electrode of the lower half partition. Therefore, since the second scan line G2 is in a low level, at this time, the touch signal cannot write to the touch electrode of the lower half partition. Further, the transistor T12 is responsible for the upper half partition of the touch writing, and the second terminal of the transistor T12 is only electrically connected with the display electrode of the upper half partition. Therefore, since the first scan line G1 is in a high level, at this time, the touch electrode of the upper half partition receives the touch signal, so as to achieve the upper half partition of the touch signal writing.

It can be seen that by the above embodiment of K=2, in the present application, the upper half partition and the lower half partition being respectively selected to display and touch in a sub-frame is realized through a topology structure of four transistors, so that the touch does not need to configure time separately for signal writing, which can reduce the single refresh duration of the display panel, so as to achieve a higher refresh rate.

In an embodiment of the present application, only K scan lines are configured. Taking above K=2 as an example, that is, only the first scan line G1 and the second scan line G2 are configured. For K=3, only three scan lines are configured, that is, only one scan line of the three scan lines in a sub-frame is in a high level. Thus, at this time, there is only one partition display or touch, and the wire where the second terminal of each transistor is located is only coupled to the corresponding touch electrode. The hardware settings are similar, and the present application will not repeated herein.

In other embodiments of the present application, the multiplex selection module includes two transistors, and each of the two transistors includes a control terminal, a first terminal, and a second terminal; and the control terminal of each of the two transistors is respectively coupled with a scan line, the first terminal of one of the two transistors is coupled with a display signal output terminal of a drive integrated chip, and the second terminal is coupled with a display electrode of the corresponding partition, the first terminal of the other one of the two transistors is coupled with a touch signal output terminal of the drive integrated chip, and the second terminal is coupled with a touch electrode of the corresponding partition, a high level is written to two scan lines in an one-to-one manner.

In the embodiment, the scan lines of each transistor are configured separately, that is, for a same column, the corresponding 4 scan lines are used for controlling. By configuring four scan lines independently, the turn-on and turn-off of each transistor are independent, so that the turn-on of the two transistors are controlled in the first sub-frame, one of the two transistors outputs the display signal of the i-th partition. The other one of the two transistors outputs the touch signal of the j-th partition, and i and j are different.

An second aspect of embodiment of the present application provides a drive method of a touch display drive circuit, the drive method includes:
  S1: writing, in each sub-frame within a single refresh duration of a display panel, a display signal to a corresponding partition through an i-th multiplex selection module group and a touch signal to the corresponding partition through the j-th multiplex selection module group; and
the i-th multiplex selection module group corresponding to each sub-frame is different, and the j-th multiplex selection module group corresponding to each sub-frame is different, and the i and j are integers less than k and greater than 1.

In the embodiment of the present application, the display panel is divided into a plurality of partitions, and one of the display signal and touch signal is written into one partition at a time. Thus, by means of row writing of the display signal, the touch signal can be written into other partitions at the same time of writing the display signal. After the writing of display signal in the same partition is completed, when other partitions are writing the display signal, the touch signal is written in this partition, so that when all the display signal is written in other partitions, the touch signal is almost written in this partition, and then the writing duration of the touch signal does not need to occupy the writing duration of the display signal. In a single refresh, the duration is only the writing duration of the current display signal. Compared with the existing technology that the writing duration of the touch signal needs to be increased, in the present application, the refresh duration is shorter, the panel display time can be increased to achieve high frequency refresh and display.

The following are detailed explanations combined with the above structural embodiments, in an embodiment, the present application can set that the writing of touch signal always lags behind the writing of the display signal by one partition, that is, when the first partition is displayed, the second partition is touched, when the second partition is displayed, the third partition is touched, and so on, so that the display and touch can be realized in each partition. In the embodiment, in each sub-frame within the single refresh duration of the display panel, the display signal is written to the corresponding partition through the i-th multiplex selection module group, and the touch signal is written to the corresponding partition through the j-th multiplex selection module group, further includes:
  writing, for a g-th sub-frame, the display signal to a g-th corresponding partition through a g-th multiplex selection module group and the touch signal to a g+1-th corresponding partition through a g+1-th multiplex selection module group; wherein the g is an integer less than or equal to K−1 and greater than or equal to 1; and
  writing, for a k-th sub-frame, the display signal to a k-th corresponding partition through a k-th multiplex selection module group and the touch signal to a first corresponding partition through a first multiplex selection module group.

It should be noted that in the embodiment, the input terminal of each multiplex selection module is controlled independently, that is, the input terminal of each multiplex selection module is controlled through a corresponding independent scan line (that is, 2K corresponding scan lines). Furthermore, the present application can also realize display and touch in an out-of-order manner, such as in a sub-frame, the touch is realized in the first partition, and the display is realized in the eighth partition; in another sub-frame, the touch is realized in the fifth partition, and the display is realized in the second partition, therefore, one of the touch and display can be written in any way through independent control.

1. Further, combined with the embodiment in FIG. 3 above, in an embodiment of the present application, the touch and display of all partitions can be realized through K transistors and K scan lines, the step of writing, in each sub-frame within the single refresh duration of the display panel, the display signal to the corresponding partition through the i-th multiplex selection module group and the touch signal to the corresponding partition through the j-th multiplex selection module group includes:

writing, for a g-th sub-frame, the display signal to a g-th corresponding partition through a g-th multiplex selection module group and the touch signal to a q-th corresponding partition through a q-th multiplex selection module group; wherein a sum of g and q is equal to that of K+1.

In the embodiment, combined with the configuration in FIG. 3, that is, the multiplex selection module includes: N transistors, each of the N transistors includes a control terminal, a first terminal and a second terminal; each partition corresponds to N scan lines; the first terminal of the transistor corresponding to the first partition is coupled with the display signal output terminal of the drive integrated chip, the second terminal of the transistor corresponding to the non-last partition is coupled with the first terminal of the i-th transistor corresponding to the same column of the next adjacent partition, and the second terminal of the i-th transistor corresponding to the last partition is coupled with the touch signal output terminal of the drive integrated chip; the i is an integer greater than 1 and less than or equal to K; the wires to which all the i-th transistors are jointly coupled are only coupled with one of the display electrode and the touch electrode of a partition. Thus, K scan lines can be saved, and the partition control of display and touch can be realized without much modification to the structure.

Figure 5:
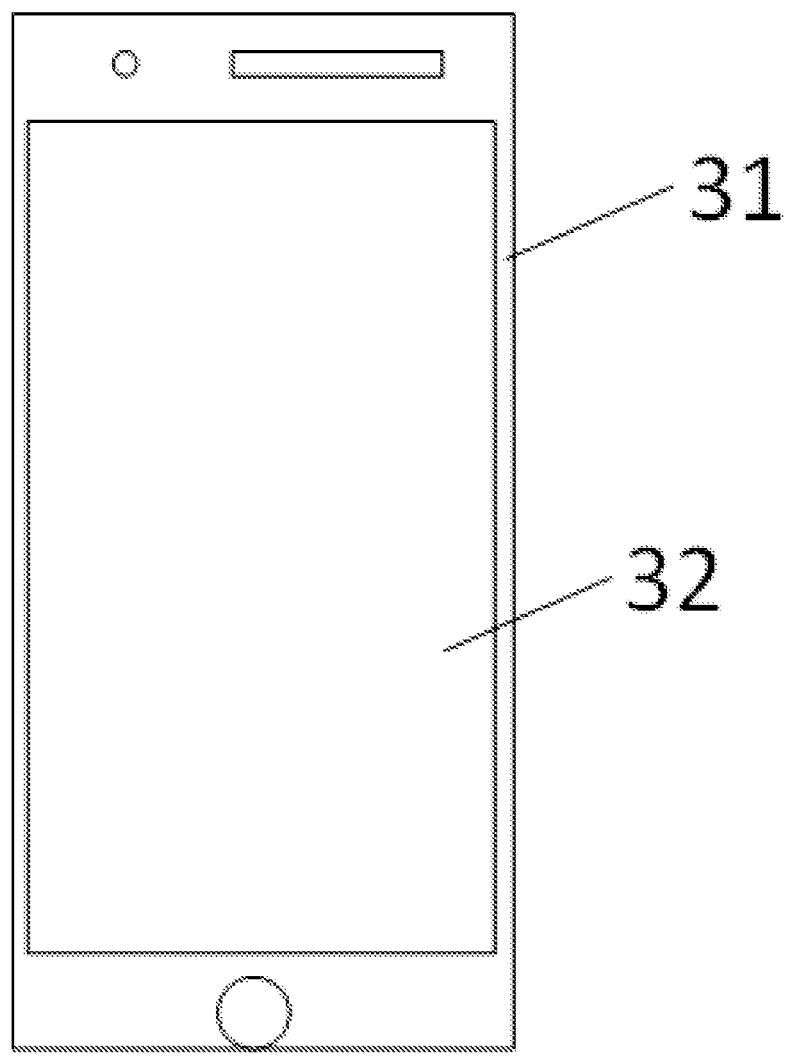
FIG. 5 is a schematic view of a terminal structure using a touch display panel of the present application embodiment.

The embodiment of the present application further provides a touch display panel 32, as shown in FIG. 5, the touch display panel 32 includes a touch display drive circuit as described above. In the specific embodiment, the touch display panel can be used for a mobile phone 31, a tablet computer, a TV, a monitor, a laptop computer, a digital photo frame, a navigator and any other products or components with display function.

It should be noted that the touch display drive circuit, the drive method and the touch display panel provided by the embodiment of the present application can be referred to each other, and which is not limited in the embodiment of the present application. The steps of the embodiments of the drive method provided by the embodiments of the present application can be increased or decreased accordingly according to the situation. Any method that can be easily thought of by those skilled in the art familiar with the technical field within the technical scope disclosed in the present application shall be covered by the protection scope of the present application and therefore shall not be repeated here.

The above are only optional embodiments of the present application and shall not be used to restrict the present application. Any modification, equivalent substitution, improvement, etc. made within the spirit and principles of the present application shall be covered by the protection of the present application.

What is claimed is:

1. A touch display drive circuit, applied to a display panel, the display panel comprising:

M rows and N columns of touch display units; the M rows and N columns of touch display units form K partitions along a column direction, each partition corresponds to a multiplex selection module group, and each partition comprises m rows and N columns of touch display units; the touch display drive circuit comprises a control module and M×N multiplex selection modules, the control module is respectively connected to each of the multiplex selection modules, and the M×N multiplex selection modules are correspondingly connected to the M rows and N columns of touch display units in an one-to-one manner, respectively; and the control module controls a multiplex selection module connected with a first touch display unit to write a display signal to the first touch display unit, and simultaneously controls a multiplex selection module connected with a second touch display unit to write a touch signal to the second touch display unit, the first touch display unit and the second touch display unit are respectively located in a same row and a same column in any two different partitions;

wherein a single refresh duration of the display panel comprises K sub-frames, and in a g-th sub-frame, a g-th multiplex selection module group is configured to write the display signal to a g-th corresponding partition, and a q-th multiplex selection module group is configured to write the touch signal to a q-th corresponding partition; wherein a sum of g and q is equal to that of K+1; and wherein m, g, q, M, N, and K are integers greater than 1.

2. The touch display drive circuit according to claim 1, wherein each multiplex selection module comprises one input terminal and two output terminals, one of the two output terminals of the multiplex selection module is coupled with a display electrode of the touch display unit of a corresponding partition, and the other one of the two output terminals is coupled with a touch electrode of the touch display unit of the corresponding partition; and the input terminal is coupled with the control module.

3. The touch display drive circuit according to claim 2, wherein the multiplex selection module is a multiplexer or a multiplex selection circuit.

4. The touch display drive circuit according to claim 1, wherein the multiplex selection module comprises two transistors, and each of the two transistors comprises a control terminal, a first terminal, and a second terminal; and the control terminal of each of the two transistors is coupled with one of a display scan line and a touch scan line of the corresponding partition, the first terminal of one of the two transistors is coupled with the display signal line, and the second terminal is coupled with the first terminal of the other one of the two transistors, and the second terminal of the other one of the two transistors is coupled with the touch signal line.

5. The touch display drive circuit according to claim 1, wherein the multiplex selection module comprises two transistors, and each of the two transistors comprises a control terminal, a first terminal, and a second terminal; and the control terminal of each of the two transistors is respectively coupled with a scan line, the first terminal of one of the two transistors is coupled with a display signal output terminal of a drive integrated chip, and the second terminal of one of the two transistors is coupled with a display electrode of the corresponding partition, the first terminal of the other one of the two transistors is coupled with a touch signal output terminal of the drive integrated chip, and the second terminal of the other one of the two transistors is coupled with a touch electrode of the corresponding partition, a high level is written to two scan lines in an one-to-one manner.

6. The touch display drive circuit according to claim 4, wherein the number of K partitions is selected from a group consisting of 2, 3, 4, and 5.

7. A drive method of a touch display drive circuit, comprising:
- writing, in each sub-frame within a single refresh duration of a display panel, a display signal to a corresponding partition through an i-th multiplex selection module group and a touch signal to the corresponding partition through a j-th multiplex selection module group;
- wherein the i-th multiplex selection module group corresponding to each sub-frame is different, and the j-th multiplex selection module group corresponding to each sub-frame is different, and the i and j are integers less than k and greater than 1; and
- wherein said writing, in each sub-frame within the single refresh duration of the display panel, the display signal to the corresponding partition through the i-th multiplex selection module group and the touch signal to the corresponding partition through the j-th multiplex selection module group comprises:
- writing, for a g-th sub-frame, the display signal to a g-th corresponding partition through a g-th multiplex selection module group and the touch signal to a q-th corresponding partition through a q-th multiplex selection module group; wherein a sum of g and q is equal to that of K+1.

8. The drive method of a touch display drive circuit according to claim 7,
- wherein the step of writing, in each sub-frame within the single refresh duration of the display panel, the display signal to the corresponding partition through the i-th multiplex selection module group and the touch signal to the corresponding partition through the j-th multiplex selection module group comprises:
- writing, for a g-th sub-frame, the display signal to a g-th corresponding partition through a g-th multiplex selection module group and the touch signal to a g+1-th corresponding partition through a g+1-th multiplex selection module group; wherein the g is an integer less than or equal to K−1 and greater than or equal to 1; and
- writing, for a k-th sub-frame, the display signal to a k-th corresponding partition through a k-th multiplex selection module group and the touch signal to a first corresponding partition through a first multiplex selection module group.

9. A touch display panel, comprising:
- M rows and N columns of touch display units and a touch display drive circuit, applied to a display panel, wherein the display panel comprises M rows and N columns of touch display units; the M rows and N columns of touch display units form K partitions along a column direction, each partition corresponds to a multiplex selection module group, and each partition comprises m rows and N columns of touch display units; the touch display drive circuit comprises a control module and M×N multiplex selection modules, the control module is respectively connected to each of the multiplex selection modules, and the M×N multiplex selection modules are correspondingly connected to the M rows and N columns of touch display units in an one-to-one manner, respectively; and
- the control module controls a multiplex selection module connected with a first touch display unit to write a display signal to the first touch display unit, and simultaneously controls a multiplex selection module connected with a second touch display unit to write a touch signal to the second touch display unit, the first touch display unit and the second touch display unit are respectively located in a same row and a same column in any two different partitions;
- wherein a single refresh duration of the display panel comprises K sub-frames, and in a g-th sub-frame, a g-th multiplex selection module group is configured to write the display signal to a g-th corresponding partition, and a q-th multiplex selection module group is configured to write the touch signal to a q-th corresponding partition; wherein a sum of g and q is equal to that of K+1;
- wherein m, M, N, and K are integers greater than 1; and
- wherein the M rows and N columns of touch display units form K partitions along a column direction, and each partition comprises m rows and N columns of touch display units.

10. The touch display panel according to claim 9, wherein each multiplex selection module comprises one input terminal and two output terminals, one of the two output terminals of the multiplex selection module is coupled with a display electrode of the touch display unit of a corresponding partition, and the other one of the two output terminals is coupled with a touch electrode of the touch display unit of the corresponding partition; and the input terminal is coupled with the control module.

11. The touch display panel according to claim 10, wherein the multiplex selection module is a multiplexer or a multiplex selection circuit.

12. The touch display panel according to claim 9, wherein the multiplex selection module comprises two transistors, and each of the two transistors comprises a control terminal, a first terminal, and a second terminal; and
- the control terminal of each of the two transistors is coupled with one of a display scan line and a touch scan line of the corresponding partition, the first terminal of one of the two transistors is coupled with the display signal line, and the second terminal is coupled with the first terminal of the other one of the two transistors, and the second terminal of the other one of the two transistors is coupled with the touch signal line.

13. The touch display panel according to claim 9, wherein the multiplex selection module comprises two transistors, and each of the two transistors comprises a control terminal, a first terminal, and a second terminal; and
- the control terminal of each of the two transistors is respectively coupled with a scan line, the first terminal of one of the two transistors is coupled with a display signal output terminal of a drive integrated chip, and the second terminal of one of the two transistors is coupled with a display electrode of the corresponding partition, the first terminal of the other one of the two transistors is coupled with a touch signal output terminal of the drive integrated chip, and the second terminal of the other one of the two transistors is coupled with a touch electrode of the corresponding partition, a high level is written to two scan lines in an one-to-one manner.

14. The touch display panel according to claim 12, wherein the number of K partitions is selected from a group consisting of 2, 3, 4, and 5.

* * * * *